US008941880B2

(12) United States Patent
Moribe

(10) Patent No.: US 8,941,880 B2
(45) Date of Patent: Jan. 27, 2015

(54) IMAGE PROCESSING APPARATUS, IMAGE PROCESSING METHOD, AND PROGRAM

(75) Inventor: Shoei Moribe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 13/189,206

(22) Filed: Jul. 22, 2011

(65) Prior Publication Data

US 2012/0019849 A1 Jan. 26, 2012

(30) Foreign Application Priority Data

Jul. 26, 2010 (JP) ................................. 2010-167003
Apr. 27, 2011 (JP) ................................. 2011-099714

(51) Int. Cl.
*G06F 3/12* (2006.01)
*G06K 1/00* (2006.01)
*H04N 1/60* (2006.01)
*H04N 1/40* (2006.01)
*H04N 1/405* (2006.01)
*H04N 1/52* (2006.01)

(52) U.S. Cl.
CPC ............... *H04N 1/4052* (2013.01); *H04N 1/52* (2013.01)
USPC .......... 358/1.9; 358/3.23; 358/3.03; 382/232; 348/14.13; 375/E7.255

(58) Field of Classification Search
USPC ........ 358/1.9, 3.03, 3.23; 382/232; 348/14.13
See application file for complete search history.

(56) References Cited

U.S. PATENT DOCUMENTS

| 6,175,424 | B1 * | 1/2001 | Iino et al. | 358/1.9 |
| 7,536,054 | B2 * | 5/2009 | Banno et al. | 382/232 |
| 7,669,953 | B2 | 3/2010 | Kakutani | |
| 2006/0092271 | A1 * | 5/2006 | Banno et al. | 348/14.13 |
| 2010/0141972 | A1 | 6/2010 | Yanai | |
| 2011/0080615 | A1 * | 4/2011 | Ono et al. | 358/3.23 |
| 2011/0128561 | A1 * | 6/2011 | Goto et al. | 358/1.9 |

FOREIGN PATENT DOCUMENTS

| CN | 101197908 A | 6/2008 |
| CN | 101552861 A | 10/2009 |
| EP | 0887998 A2 | 12/1998 |
| EP | 2046011 A2 | 4/2009 |
| EP | 2107789 A2 | 10/2009 |
| JP | 2002-096455 A | 4/2002 |
| JP | 2007-106097 A | 4/2007 |
| JP | 2008-258866 A | 10/2008 |

* cited by examiner

*Primary Examiner* — Akwasi M Sarpong
(74) *Attorney, Agent, or Firm* — Canon U.S.A., Inc. IP Division

(57) ABSTRACT

Data of each plane capable of obtaining a high-quality output image is generated. An image processing apparatus for quantizing input image data having gradation of an m value (m is a natural number) into output image data having gradation of an n value (n is a natural number smaller than m) includes a quantization unit configured to quantize input image data having gradation of an m value in a target pixel into output image data having gradation of an n value, and a plane separation unit configured to determine that the quantization value quantized by the quantization unit is to be assigned to the target pixel of which plane out of planes of two types or more, wherein the plane separation unit determines that the quantization value is to be assigned to the target pixel of which plane, based on distance information of the target pixel indicating distances, to the target pixel, from pixels on which a recording material is recorded in the each plane.

12 Claims, 8 Drawing Sheets

FIG.6

| y | | | | | | | | | | | |
|---|---|---|---|---|---|---|---|---|---|---|---|
| 0 | 255 | 255 | 255 | 0 | 1 | 2 | 3 | 4 | 5 | 6 | 7 | 8 |
| 1 | 4 | 3 | 2 | 1 | 2 | 3 | 3 | 2 | 1 | 0 | 8 | 9 |
| 2 | 5 | 4 | 3 | 2 | 3 | 4 | 4 | 3 | 2 | 1 | 2 | 3 |
| 3 | 1 | 0 | 4 | 3 | 4 | 5 | 5 | 4 | 3 | 2 | 3 | 4 |
| 4 | 2 | 1 | 2 | 3 | 4 | 5 | 6 | 5 | 4 | 3 | 0 | 1 |
| 5 | 3 | 2 | 3 | 3 | 2 | 1 | 0 | 4 | 3 | 2 | 1 | 2 |
| 6 | 4 | 3 | 4 | 0 | 1 | 2 | 1 | 2 | 3 | 3 | 2 | 3 |
| 7 | 0 | 3 | 2 | 1 | 2 | 3 | 2 | 3 | 4 | 4 | 3 | 4 |
| 8 | 1 | 2 | 3 | 2 | 3 | 4 | 3 | 4 | 5 | 5 | 0 | 1 |
| 9 | 2 | 3 | 2 | 1 | 0 | 5 | 4 | 5 | 4 | 3 | 2 | 2 |
| 10 | 3 | 4 | 3 | 2 | 1 | 2 | 3 | 4 | 5 | 4 | 3 | 3 |

IMAGE PROCESSING APPARATUS, IMAGE PROCESSING METHOD, AND PROGRAM

BACKGROUND OF THE INVENTION

1. Field of the Invention

The present invention relates to a technique for quantizing input image data having gradation of an m value (m is a natural number) into output image data having gradation of an n value (n is a natural number smaller than m).

2. Description of the Related Art

Information output apparatuses for digital cameras, personal computers, and the like include various types of recording apparatuses for performing recording of information such as desired characters, images, or the like on a sheet recording medium such as recording paper, film, or the like. In such recording apparatuses, methods for forming characters or an image on a recording medium by adhering a recording material on the recording medium have been put to practical use. An example of such methods is inkjet recording apparatuses.

Generally, in order to increase recording speeds and image quality, an inkjet recording apparatus includes a nozzle group formed by integrating and arranging arrays of ink discharge ports (nozzles) that can discharge ink of the same color and the same density. Further, in a case where the inkjet recording apparatus includes inks of different colors, a nozzle group is provided for each color. Further, as to nozzles that can discharge ink of the same color and different densities or ink of the same color and the same density by changing the amounts of discharge in several steps, a nozzle group can be provided respectively.

In such image forming apparatuses, image processing methods for converting multi-valued input image data into print data corresponding to a record signal of dots includes an error diffusion method. In the error diffusion method, by diffusing an error produced in pixels in binarization processing in peripheral pixels to be processed later, pseudo-gradation expression can be performed.

When an image is formed by the image forming apparatus using image data on which gradation number conversion is performed, a multipass recording method for forming the image by a plurality of passes (scans) is often used. The method for calculating print data in each pass includes a method that uses a mask pattern. Japanese Patent Application Laid-Open No. 2002-096455 discusses an example of the method.

Binary image data is separated into each pass by an AND operation with a mask pattern for each pass. By the above-described multipass recording method, effects due to variation in the ink discharge amounts and discharge directions are reduced by half. Accordingly, the density unevenness in the formed image is reduced.

In the multipass recording method using the mask pattern, the data obtained by integrating the print data of each pass is equal to the original binary image data. However, if a relative positional deviation occurs between each pass, the graininess of the image deteriorates, and the image quality of the output image significantly decreases.

The deterioration in the image quality in the multipass recording method using the mask pattern is due to low dispersiveness of the dots printed in each pass, which also causes decrease in dispersiveness in the dot arrangement in the output image, when the positional deviation has occurred.

Further, if the above-mentioned problem is generalized, a common problem exists also in the intercolor exclusive technique and small, medium, and large dot exclusive technique. According to the intercolor exclusive technique, in binarization processing in an apparatus that has ink of a plurality of different colors, dot arrangement is controlled so that the overlap of the dots of the different colors is reduced. In the intercolor exclusive technique, while the dispersiveness in the dot arrangement of each color is kept at a high level, the dispersiveness in the dot arrangement in the image in which each color is integrated is also to be kept at a high level.

According to the small, medium, and large dot exclusive technique, in an apparatus that can discharge ink of the same density by changing the discharge amounts at several levels, the dispersiveness in the dot arrangement of different discharge amounts is increased. In the small, medium, and large dot exclusive technique, while the dispersiveness in the dot arrangement of each discharge amount is kept at a high level, the dispersiveness in the image in which the dots of each discharge amount is integrated is also to be kept at a high level.

As described above, in the image forming apparatus that can output different types of dots, while the dispersiveness of the various types of dots is increased, the dispersiveness of the dots that are formed by integrating the various types of dots is also to be increased. By the processing, the graininess and the density unevenness of the formed image can be improved.

In the description, the different types of dots include dots in each pass in the multipass recording method, dots of ink of each color in the multicolor recording, and dots of each discharge amount in the small, medium, and large dot recording.

Japanese Patent Application Laid-Open No. 2008-258866 discusses an interpass exclusive technique in the multipass recording. That is, Japanese Patent Application Laid-Open No. 2008-258866 discusses a technique for detecting a relative positional deviation amount between passes. If the positional deviation amount is small, an error diffusion method is used, and if the positional deviation amount is large, a dither matrix that is strongly designed to the deviation is used. Methods for generating a dither matrix include a method discussed in Japanese Patent Application Laid-Open No. 2007-106097. In the method, optimization calculation including the graininess of each pass in an evaluation value is performed.

However, the technique discussed in Japanese Patent Application Laid-Open No. 2008-258866 requires means for detecting the positional deviation amount, and therefore, the cost of the apparatus becomes high. Further, if the positional deviation amount is large, only the gradation conversion using the dither matrix can be used. The gradation conversion using the dither matrix is faster than that using the error diffusion method, however, it is known that the gradation conversion using the dither matrix is rather inferior to that using the error diffusion method in the graininess.

To solve the problems, a technique for increasing the dispersiveness of the dots that are formed by integrating each pass while increasing the dispersiveness of the dots of each pass without limiting the gradation conversion means is desired.

SUMMARY OF THE INVENTION

The present invention is directed to an image processing apparatus and an image processing method capable of generating data for each plane with which a high-quality output image can be obtained.

According to an aspect of the present invention, an image processing apparatus for quantizing input image data having gradation of an m value, where m is a natural number, into output image data having gradation of an n value, where n is a natural number smaller than m, includes a quantization unit configured to quantize input image data having gradation of an m value in a target pixel into output image data having gradation of an n value, and a plane separation unit configured to determine which plane out of planes of at least two types that the quantization value quantized by the quantization unit is to be assigned to the target pixel of, wherein the plane separation unit is configured to determine which plane based on distance information of the target pixel indicating distances, to the target pixel, from pixels on which a recording material is recorded in each plane.

According to the present invention, data of each plane, with which high-quality output image can be obtained, can be generated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates distance information of a pass generated according to the exemplary embodiments of the present invention.

DESCRIPTION OF THE EMBODIMENTS

Various exemplary embodiments, features, and aspects of the invention will be described in detail below with reference to the drawings.

The exemplary embodiments described below are in no way intended to limit the present invention. Further, not all combinations of features described in the exemplary embodiments below are necessary for the present invention.

Figure 1:
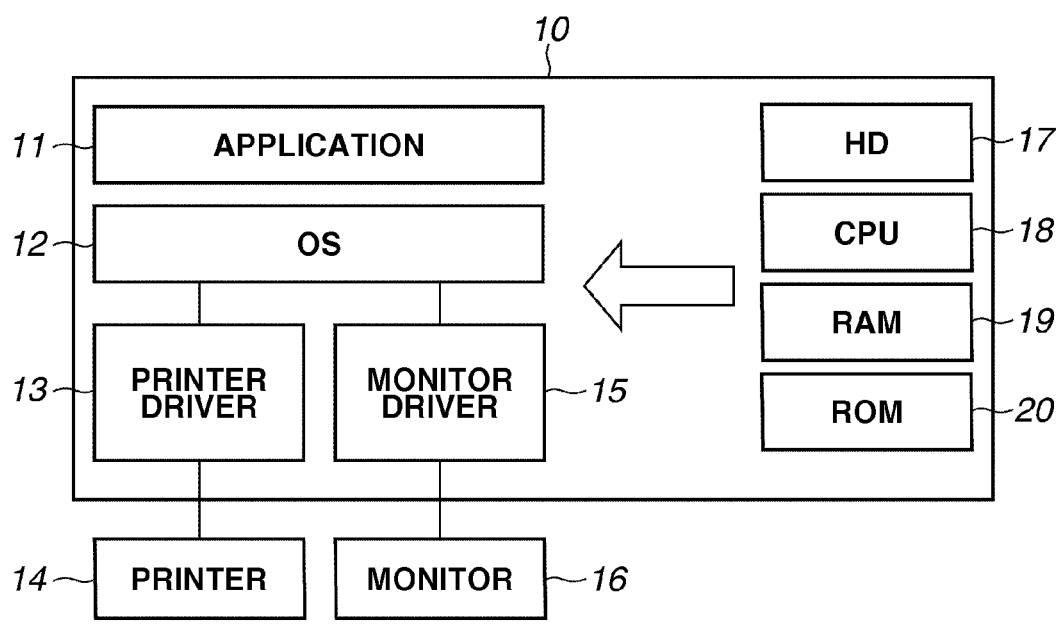
FIG. 1 is a block diagram illustrating a configuration of hardware and software in an image processing apparatus according to a first exemplary embodiment of the present invention.

First, a first exemplary embodiment of the present invention is described. FIG. 1 is a block diagram illustrating a configuration of hardware and software in an image processing apparatus 10 according to the first exemplary embodiment.

As illustrated in FIG. 1, the image processing apparatus 10 is connected with a printer 14 that prints image data and a monitor 16 that displays the image data. The image processing apparatus 10 can be composed of a personal computer, or the like.

In FIG. 1, the image processing apparatus 10 operates each software such as an application software 11, a printer driver 13, and a monitor driver 15 by an operating system (OS) 12. The application software 11 performs processing relating to a word processor, a spreadsheet, an Internet browser, or the like. The monitor driver 15 performs processing such as generating image data to be displayed on the monitor 16.

A printer driver 13 performs drawing processing of various drawing instructions (image drawing instruction, text drawing instruction, graphic drawing instruction, and the like) issued from the application software 11 to the OS 12, and generates multivalued CMYK image data to be used in the printer 14.

The image processing apparatus 10 includes various types of hardware for operating the above-described software, e.g., a central processing unit (CPU) 18, a hard disk 17, a random access memory (RAM) 19, a read-only memory (ROM) 20. The CPU 18 executes processing according to the above-described software stored in the HD 17 or the ROM 20, and the RAM 19 is used as a work area during the execution of the processing.

The printer 14 is a so-called serial printer that performs scanning with a recording head for discharging ink to a recording medium, and performs recording by discharging the ink during the scanning. The scanning with the head is performed by using a so-called multipass recording method for separating an image for scanning of a plurality of times and forming the image.

The printer 14 receives multivalued CMYK image data from the printer driver 13, and converts the data into binary CMYK image data for each scanning. A recording head is provided for each ink of C, M, Y, and K respectively. By mounting the recording heads on a carriage, scanning can be performed to a recording medium such as recording paper.

The arrangement density of discharge ports in each recording head is 1200 dpi. The discharge port has three types of sizes. From each discharge port, ink droplets of 10 Pico liters, 6 Pico liters, and 3 Pico liters are discharged, respectively. The droplets are referred to as a large dot, medium dot, and small dot, respectively.

Next, a method for performing plane separation processing on multivalued CMYK image data according to the present exemplary embodiment is described. In the description, the plane separation processing includes plane separation of data into each pass plane in the multipass recording method, plane separation of data into each color plane of CMYK image data, and plane separation of data into each dot size for the small, medium, and large dots.

In the following description, in the coordinate system of the image, the horizontal direction is x, the vertical direction is y, and the upper left end is an origin point (0, 0) of an image. In the binary image data indicating ON and OFF of dots, 1 corresponds to ON, and 0 corresponds to OFF. The number of the pass planes are N.

Figure 2:
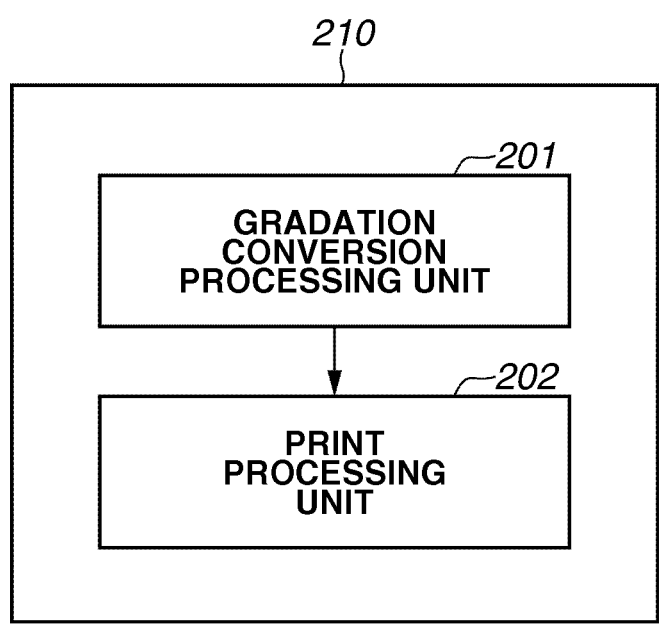
FIG. 2 is a block diagram illustrating a functional configuration of an image forming apparatus according to first and third exemplary embodiments of the present invention.

FIG. 2 is a block diagram illustrating a functional configuration of the image forming apparatus 210 according to the first exemplary embodiment.

A gradation conversion processing unit 201 performs plane separation for each of color planes of C, M, Y, and K by binarizing multivalued image data before plane separation using an error diffusion method, and generates binary image data for each pass plane. In generating the binary image data for each pass plane, the gradation conversion processing unit 201 refers to distance information and plane separation ratio data stored for each pass plane.

A print processing unit 202 records the binary image data of each pass plane input from the gradation conversion processing unit 201 on the recording medium. In the recording, using the above-described recording heads and the ink, according to the multipass recording method, an image is formed.

Figure 3:
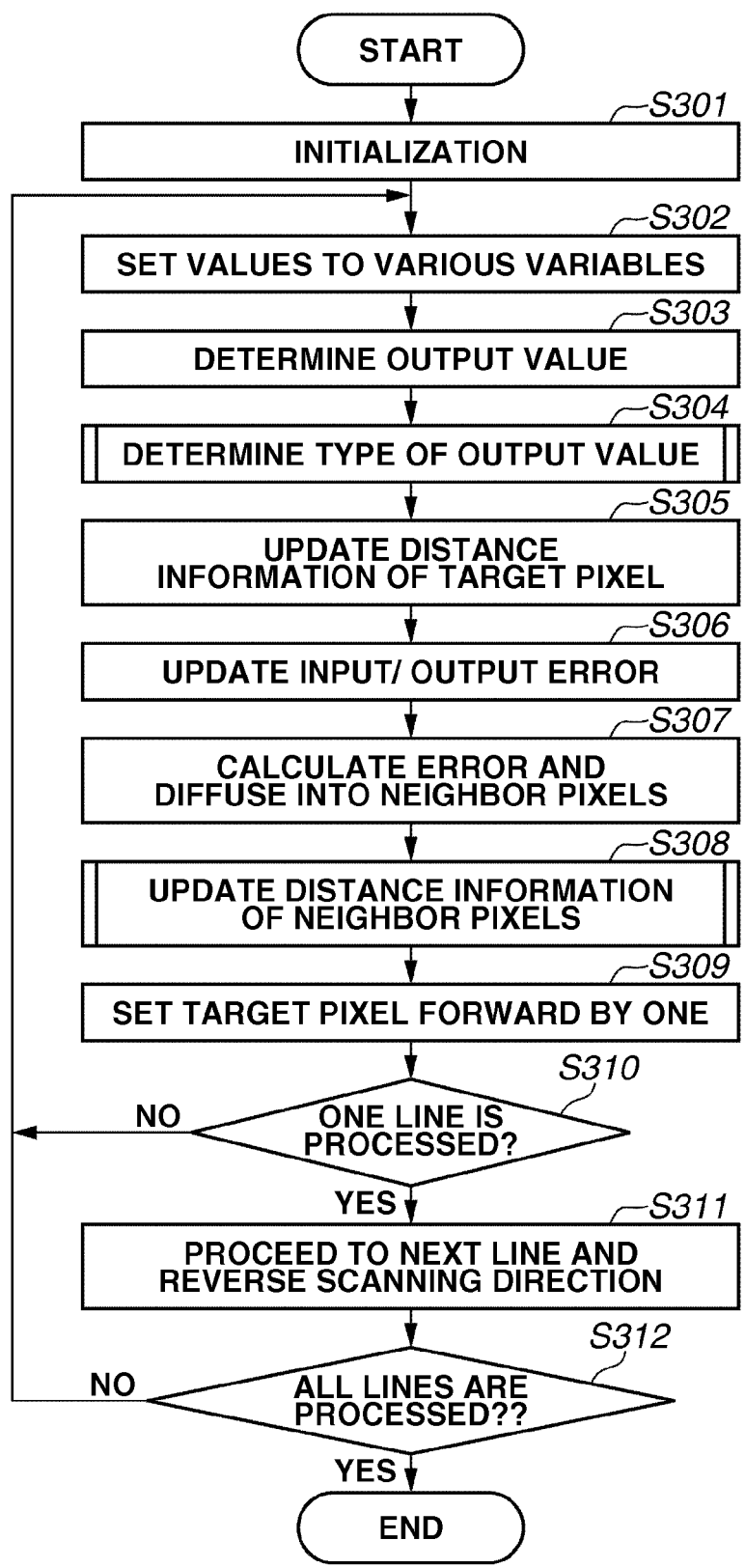
FIG. 3 is a flowchart illustrating a detailed processing in a gradation conversion processing unit.

FIG. 3 is a flowchart illustrating detailed processing in the gradation conversion processing unit 201.

In step S301, the gradation conversion processing unit 201 initializes variables, distance information $\delta$ (k, x, y) of each pass plane, and input/output error $\sigma$ (k) of each pass plane used in the error diffusion method, where k is a variable indicating a number of the pass plane, and $1 \leq k \leq N$. In the variables used in the error diffusion method, a target pixel position (x, y), a cumulative error D (x, y), and a scanning direction are initialized in step 301.

The target pixel position (x, y) is initialized to (0, 0), the all cumulative errors D (x, y) are initialized to zero, and the scanning direction is initialized to the right direction (x-axis positive direction). The scanning direction is a scanning direction in the processing according to the error diffusion method, and the scanning direction has nothing to do with scanning in the multipass recording method.

All of the distance information $\delta$ (k, x, y) of each pass plane is initialized to an upper limit of the distance information. The upper limits can be set to any values, however, according to an experiment by the inventors, it is only necessary to set the upper limits to equal values to upper limits in multivalued image data of an input color plane. Therefore, for example, if the multivalued image data of the color plane is image data of 8 bits, all of $\delta$ (k, x, y) are initialized to 255. All input/output errors $\sigma$ (k) of each pass plane are initialized to zero.

In step S302, the gradation conversion processing unit 201 sets values to the various variables. First, the gradation conversion processing unit 201 acquires a pixel value of multivalued image data of a color plane at the target pixel position (x, y), and sets the value as an input value I (x, y).

Further, the gradation conversion processing unit 201 acquires plane separation ratio data at the target pixel position (x, y), and sets the acquired data as r (k, x, y). In the present exemplary embodiment, the plane separation ratio data is a ratio in separating the input value I (x, y) into each pass plane.

Further, the gradation conversion processing unit 201 acquires error diffusion coefficients c1, c2, c3, and c4, and a threshold T (x, y) by referring to a LUT corresponding to the input value I (x, y). The error diffusion coefficients c1, c2, c3, and c4 are weight coefficients to be used in diffusing an error E to be calculated in step S307 (described below) into neighbor pixels.

In step S303, the gradation conversion processing unit 201 determines an output value O (x, y) that is a quantization value. The output value O (x, y) is determined by the following determination equations for comparing a sum of the input value I (x, y) and the cumulative error D (x, y) with the threshold T (x, y).

$$O(x,y)=1 \text{ if } (I(x,y)+D(x,y) \geq T(x,y)).$$

$$O(x,y)=0 \text{ if } (I(x,y)+D(x,y) < T(x,y)).$$

In step S304, the gradation conversion processing unit 201 determines the type of the output value. In the present exemplary embodiment, the type of the output value means "the output value is to be separated to which plane". That is, in step S304, the gradation conversion processing unit 201 determines the value O (k, x, y) by separating the output value O (x, y) into pass planes.

Figure 4:
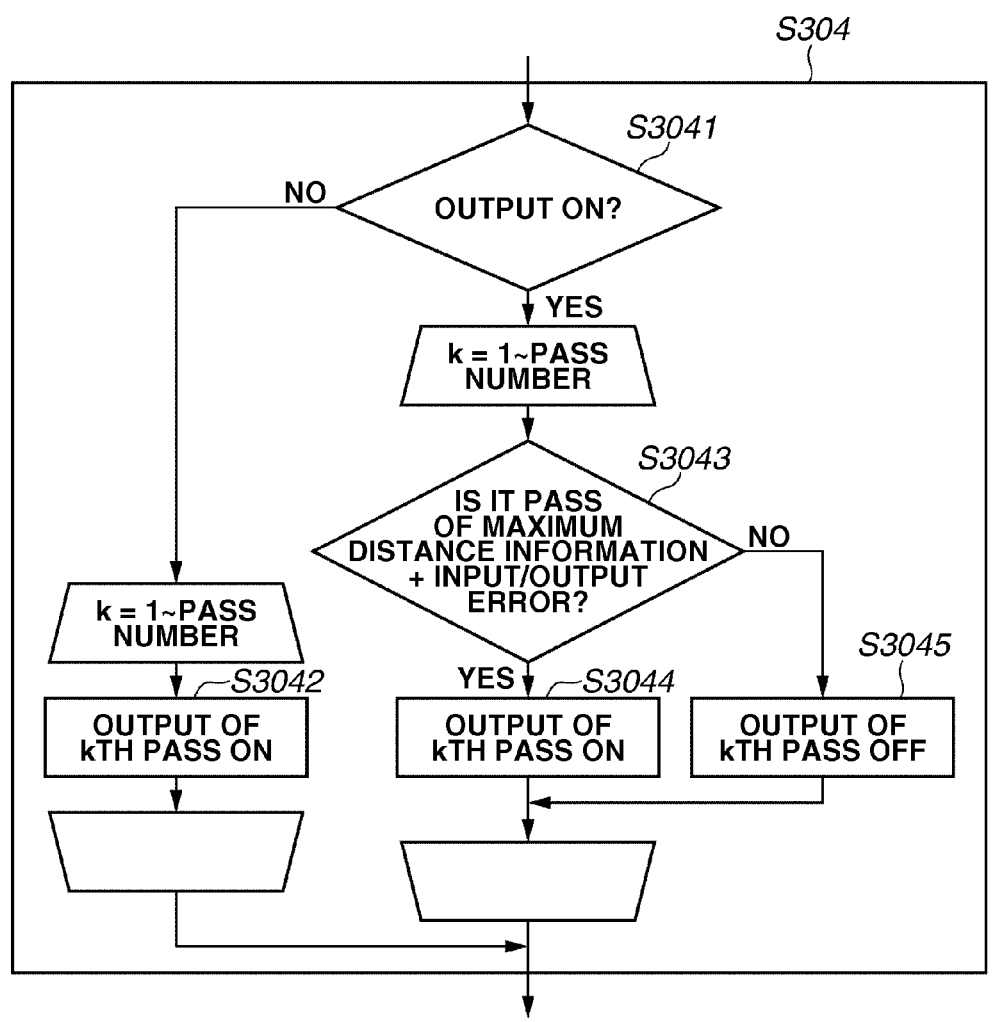
FIG. 4 is a flowchart illustrating detailed processing in step S304 in FIG. 3.

Hereinafter, the processing in step S304 is described in detail with reference to FIG. 4. In step S304, first, in step S3041, the gradation conversion processing unit 201 performs ON/OFF determination of the output value O (x, y) input in step S303. If the output value is OFF (O (x, y) is zero), in step S3042, the gradation conversion processing unit 201 sets all of the output values O (k, x, y) of each pass plane to zero, and then, ends the processing in step S304.

If the output value is ON (O (x, y) is one), in step S3043, the gradation conversion processing unit 201 searches for a pass in which the sum of the distance information $\delta$ (k, x, y) of each pass plane and the weighted input/output error $\sigma$ (k) of each pass plane becomes a maximum value. That is, using a weight coefficient $\alpha$, the gradation conversion processing unit 201 searches for k that satisfies the following expression with respect to the pass number k:

$$\text{Max}[\delta(k,x,y)+\alpha \times \sigma(k)].$$

The number of k is defined as kmax. In step S3044, the gradation conversion processing unit 201 sets one to the output value with respect to the kmax-th pass (O (kmax, x, y)=1). With respect to passes other than the kmax-th pass, in step S3045, the gradation conversion processing unit 201 sets zero to the output values.

In step S305, the gradation conversion processing unit 201 updates the distance information $\delta$ (k, x, y) for each pass plane. If the output value O (k, x, y) of the corresponding pass number k is one, the information is updated to distance information $\delta$ (k, x, y)=0. In the other cases, the distance information $\delta$ (k, x, y) is not updated, and the current values are held without changing them.

In step S306, the gradation conversion processing unit 201 updates the input/output error $\sigma$ (k) of each pass plane. As illustrated in the following expression, to the all input/output errors $\sigma$ (k) of the pass number k, a difference between a value obtained by multiplying the input value I (x, y) by the plane separation ratio data r (k, x, y) and O (k, x, y) is added. In the expression, the symbol of operation "+=" means to add a value of the right-hand side to a current value of the left-hand side and update.

$$\sigma(k) += r(k,x,y) \times I(x,y) - O(k,x,y).$$

The value $\sigma$ (k) defined by the above expression is to be a value indicating excess or deficiency of the output value at the image of k-th pass. Accordingly, if $\sigma$ (k) is a large negative value, it is preferable to perform control so that a dot of ON is more likely to be distributed to the k-th pass.

In step S307, the gradation conversion processing unit 201 calculates an error (quantization error) E, and diffuses the error into neighbor pixels. The error E is a difference between the sum of the input value I (x, y) and the cumulative error D (x, y), and the output value O (x, y). The error E is defined by the following equation:

$$E = I(x,y) + D(x,y) - O(x,y).$$

The error E is distributed to the neighbor pixels at ratios corresponding to the above-mentioned error diffusion coefficients c1, c2, c3, and c4, and added to the cumulative error. In the present exemplary embodiment, c1, c2, c3, and c4 are diffusion ratios to adjacent pixels in the right direction, the lower left direction, the downward direction, and the lower right direction, respectively. By the following expression, the neighbor cumulative error is updated.

$$D(x+1,y) += c1 \times E,$$

$$D(x-1,y+1) += c2 \times E,$$

$$D(x,y+1) += c3 \times E,$$

$$D(x+1,y+1) += c4 \times E.$$

The above-described diffusion directions are used in the case where the scanning direction is the right direction (x-axis normal direction). If the scanning direction is the left direction, the following expressions in which the right and left directions are reversed are used.

$$D(x-1,y) += c1 \times E,$$

$$D(x+1,y+1) += c2 \times E,$$

$$D(x,y+1) += c3 \times E,$$

$$D(x-1,y+1) += c4 \times E.$$

Figure 5:
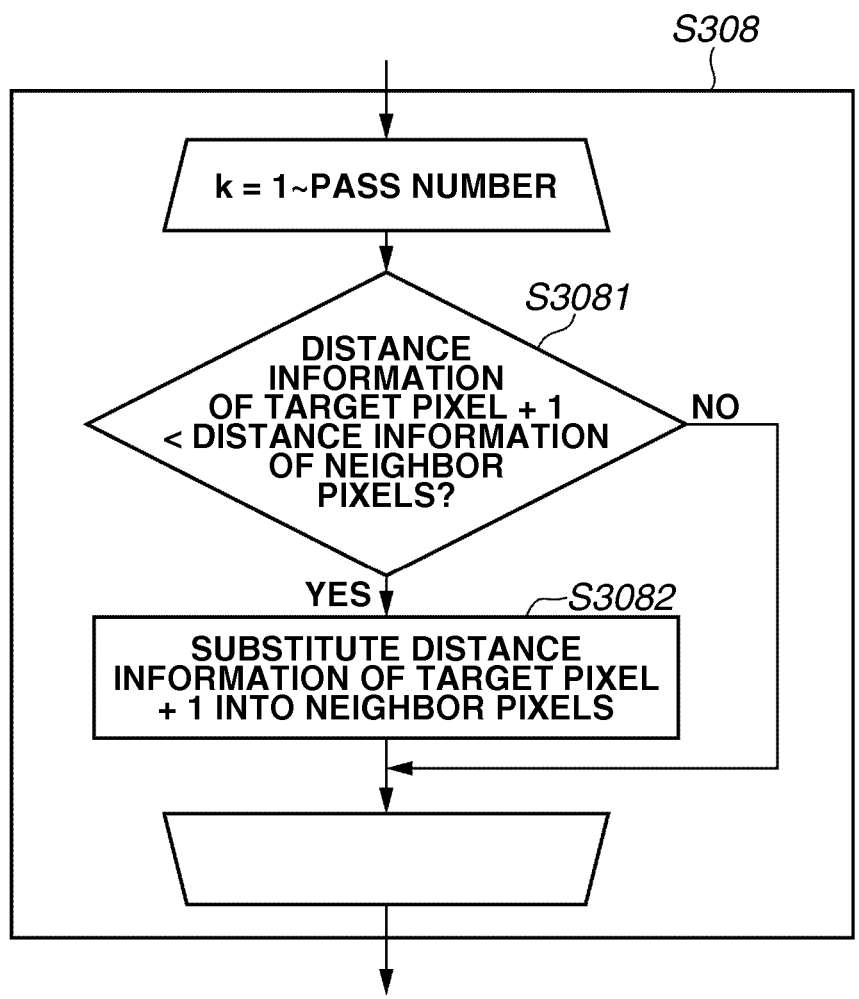
FIG. 5 is a flowchart illustrating detailed processing in step S308 in FIG. 3.

In step S308, the gradation conversion processing unit 201 updates the distance information in the neighbor pixels in each plane. Hereinafter, the processing in step S308 is described in detail with reference to FIG. 5.

In step S3081, the gradation conversion processing unit 201 compares the size of a value obtained by adding one to the distance information δ (k, x, y) of the target pixel with the size of the distance information of the neighbor pixels. The neighbor pixels include two types of pixels, that is, the right direction adjacent pixel and the downward direction adjacent pixel of the target pixel.

As a result of the comparison, if the distance information of the neighbor pixels is larger, in step S3082, the value of the distance information of the target pixel+1 is set. The operation is expressed by the following expressions.

$$\delta(k,x+1,y) = \delta(k,x,y)+1 \text{ if } (\delta(k,x,y)+1 < \delta(k,x+1,y)),$$

$$\delta(k,x,y+1) = \delta(k,x,y)+1 \text{ if } (\delta(k,x,y)+1 < \delta(k,x,y+1)).$$

The above-described neighbor pixels are used in the case where the scanning direction is the right direction (x-axis positive direction). If the scanning direction is the left direction, the following expressions in which the right and left directions are reversed are used.

$$\delta(k,x-1,y) = \delta(k,x,y)+1 \text{ if } (\delta(k,x,y)+1 < \delta(k,x-1,y)),$$

$$\delta(k,x,y+1) = \delta(k,x,y)+1 \text{ if } (\delta(k,x,y)+1 < \delta(k,x,y+1)).$$

In step S309, the gradation conversion processing unit 201 sets the target pixel (x, y) forward by one. If the scanning direction is the right direction, one is added to x. If the scanning direction is the left direction, one is subtracted from x. In step S310, the gradation conversion processing unit 201 determines whether processing of one line has been finished.

The determination processing is performed by comparing the pixel position x with the image width w. If the processing of one line has been finished (YES in step S310), the processing proceeds to step S311. If the processing has not been finished (NO in step S310), the processing returns to step S302.

In step S311, the gradation conversion processing unit 201 proceeds to the next line, and reverses the scanning direction. First, the gradation conversion processing unit 201 adds one to the pixel position y. Then, if the current scanning direction is the right direction, the gradation conversion processing unit 201 sets the pixel position x at the right end of the image, and reverses the scanning direction to the left direction.

On the other hand, if the current scanning direction is the left direction, the gradation conversion processing unit 201 sets the pixel position x at the left end of the image, and reverses the scanning direction to the right direction.

In step S312, the gradation conversion processing unit 201 determines whether processing has been performed to all lines. The determination processing is performed by comparing the pixel position y with the image height h.

If the processing has been finished to all the lines (YES in step S312), the processing of the gradation conversion processing unit 201 ends. If the processing has not been finished (NO in step S312), the processing returns to step S302.

By performing the above-described processing, in the pass separation processing in the multipass recording method, both of the dispersiveness in the dot arrangement of each pass plane and the dispersiveness in the dot arrangement in the plane where the pass planes are integrated, can be increased.

FIG. 6 illustrates distance information of a pass plane generated in the present exemplary embodiment.

The values set to respective pixels indicate distances to nearest dots in the processed pixels viewed from the target pixel. In the present exemplary embodiment, the distance to an adjacent pixel in the vertical direction or the horizontal direction is calculated as one, and the distance to an adjacent pixel in the oblique direction is calculated as two.

Figure 7A:
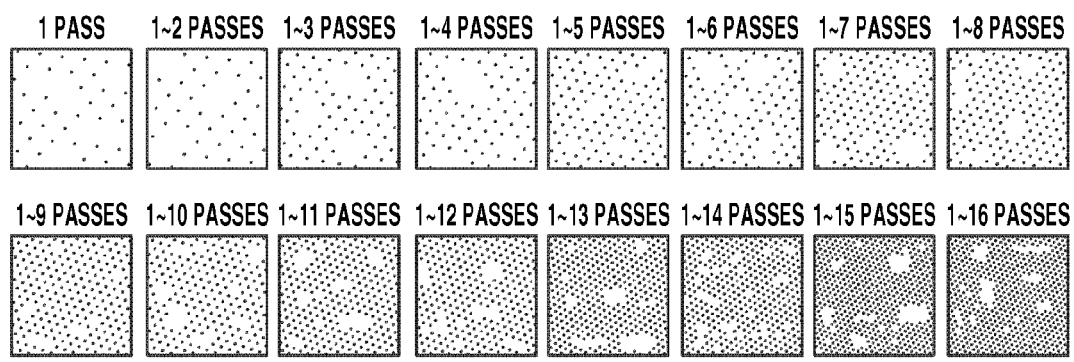
FIGS. 7A and 7B illustrate comparison between images of pass planes generated according to the exemplary embodiments of the present invention and images of pass planes generated according to a known method.
Figure 7B:
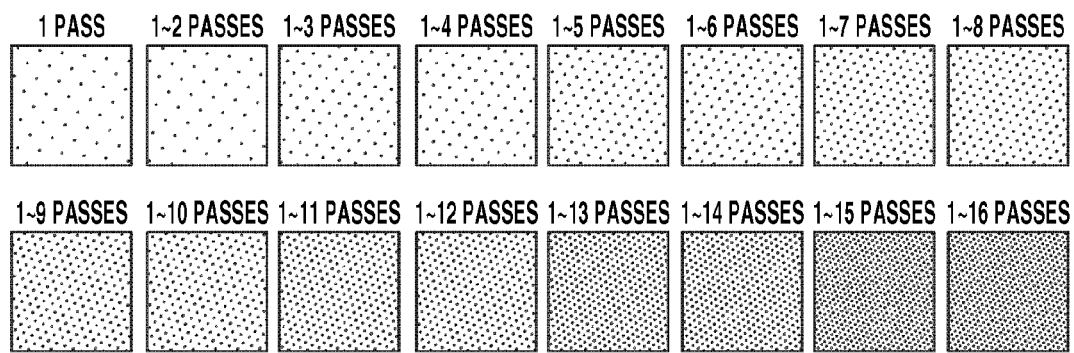

FIGS. 7A and 7B illustrate comparison between images (FIG. 7B) of pass planes generated according to the present exemplary embodiment and images (FIG. 7A) of pass planes generated according to a known method. FIGS. 7A and 7B illustrate images of pass planes of only the first passes to images formed by integrating images of subsequent passes. The expression "1 to k pass" means that the image is formed by integrating pass planes of the first pass to k-th pass.

In the known method, the plane separation is performed using a mask pattern after binarization processing. However, it is understood that in the process of integrating the images of the pass planes, the dispersiveness in the dot arrangement becomes worse. On the other hand, from the results of the present exemplary embodiment, it is understood that in the process of integrating the images of the pass planes, the dispersiveness in the dot arrangement is good. This is because by the plane separation using the above-described distance information, the dots in the images of each pass plane are not too close or not too far.

Further, in the present exemplary embodiment, with one processing, the plane separation can be performed. In other words, it is not necessary to repeat the processing in the error diffusion method for the number of times of the pass number N. The amount of the memory for storing the distance information illustrated in FIG. 6 may be enough to be capable of storing one line of an image for each pass. This is because the distance information of the processed pixels is not necessary, and the information can be overwritten.

From the above-described reasons, for the acquisition of the distance information, it is preferable to use the method described in the present exemplary embodiment, however, the method is not limited thereto. For example, an output value of a processed pixel can be stored, and a nearest neighbor dot from the target pixel can be searched.

The configuration according to the present exemplary embodiment is only an example. Parts corresponding to conventional processing in the error diffusion method can be modified using a related art. For example, in the determination of selecting the output value O (x, y), a random fluctuation component can be added to the threshold T (x, y).

For the initial value of the cumulative error D (x, y), a random fluctuation component can be used. The scanning directions of the pixels and the diffusion directions of the error are not also limited to the above-described examples, and can be applied to any modification.

The quantization method is not limited to the error diffusion method, and any other method can be used. For example, a quantization method using a dither matrix can be used.

If the dither matrix is used for the quantization method, the cumulative error D (x, y) and the error diffusion coefficients c1, c2, c3, and c4 in the above-described exemplary embodiment are not necessary, and for the threshold T (x, y), a predetermined dither matrix is set.

Further, from the determination equations in step S303, the terms D (x, y) are removed, and the error processing in step S307 is not necessary. As a result, the configuration becomes simple.

However, when parallel processing is performed in each dither matrix, due to discontinuous distance information at a boundary of the matrix, a visually annoying line can be produced at the boundary part. To solve the problem, it is preferable to take known countermeasures such as giving an offset to the arrangement of the dither matrix together with the method.

Also, the data format is only an example. For example, a configuration for receiving Lab*image data or CMYK image data as an input can be applied. Further, without using the pass plane separation ratio data r (k, x, y), an input image I (k, x, y) to which plane separation has been performed in advance can be received as an input.

As the recording material for the output apparatus, a recording material of low density or a colorless recording material can be used.

The multipass recording method is not limited to the method for scanning the recording medium surface a plurality of times with the recording head. For example, in a printer that has a recording head longer than the width of a recording medium, the printer having a so-called line head, the multipass recording can be performed by providing a plurality of recording heads. In such a system, the present invention can apparently be applied.

Also, the definitions of the distance information and the input/output error are not limited to the above-described example. For example, when the distance information at a neighbor pixel is updated, an oblique direction can be included. In such a case, in the vertical and horizontal directions, distance information of the target pixel+1 can be compared and substituted, and in the oblique direction, distance information of the target pixel+√2 can be compared and substituted.

The definition of the input/output error of each pass is not limited to the above-described example, for example, the values can be updated using a cumulative error D (k, x, y) of each pass and the following equation:

$$\sigma(k) += r(k,x,y) \times \{I(x,y)+D(x,y)\} - O(k,x,y).$$

If the value exceeds a set upper or lower limit, clipping can be performed. In the present exemplary embodiment, the output value O (x, y) has two values of zero or one, however, three or more values can be used. That is, an input value (input image data) having gradation of m value (m is a natural number) can be quantized into an output value (output image data) having gradation of an n value (n is a natural number smaller than m).

This can be implemented by a simple modification, for example, in a case where the output value has three values, in step S303, in determining the output value O (x, y), two thresholds of T1 (x, y), and T2 (x, y) are used in the following equations:

$$O(x,y)=2 \text{ if } (I(x,y)+D(x,y) \geq T1(x,y)),$$

$$O(x,y)=1 \text{ if } (T1 > I(x,y)+D(x,y) \geq T2(x,y)),$$

$$O(x,y)=0 \text{ if } (I(x,y)+D(x,y) < T2(x,y)).$$

Then, in step S304, in determining the type of the output value, top two passes having large $\delta(k, x, y) + \alpha \times \delta(k)$ are to be searched.

As described above, in the present exemplary embodiment, it is not necessary to perform the processing of the error diffusion method the number of times the same as the number of the pass planes. Accordingly, the error diffusion processing strong for positional deviation can be performed with smaller calculation amount.

A second exemplary embodiment of the present invention is described. In the first exemplary embodiment, the pass separation processing in the multipass recording method has been described. In the second exemplary embodiment, a plane separation of CMYK image data into an image of each color plane is described.

In binarization processing in an apparatus that has inks of different colors, it is preferable to control dot arrangement so that the overlap of dots of the different colors is reduced. This can be achieved by extending the relationship of the pass planes in the first exemplary embodiment to color planes.

Figure 8:
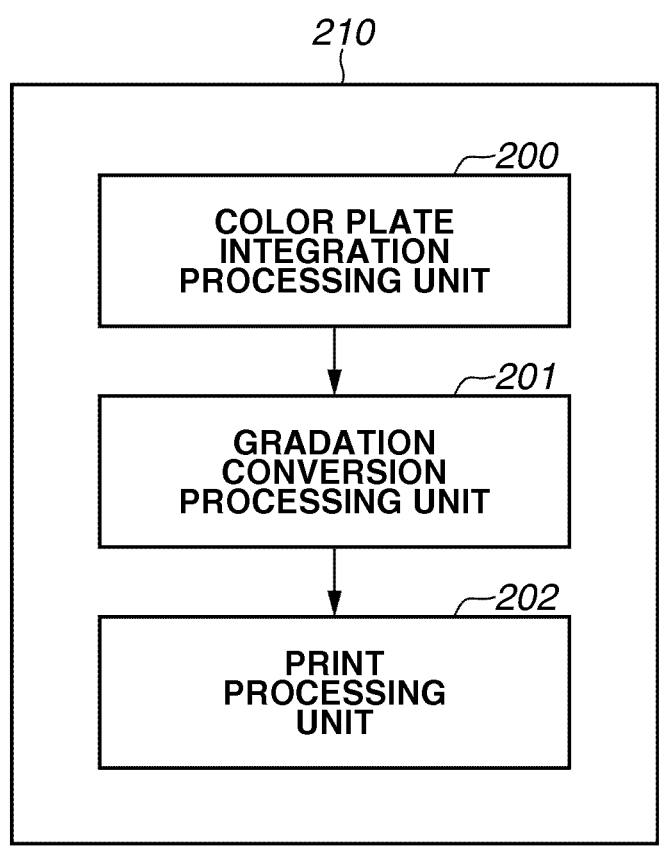
FIG. 8 is a block diagram illustrating a functional configuration of an image forming apparatus according to a second exemplary embodiment of the present invention.

FIG. 8 is a block diagram illustrating a functional configuration of the image forming apparatus 210 according to the second exemplary embodiment. Except for a color integration processing unit 200 added to the functional configuration illustrated in FIG. 2, the configuration is similar to that in the image forming apparatus according to the first exemplary embodiment. The configuration of the hardware and the software in the image processing apparatus 10 according to the second exemplary embodiment is similar to that illustrated in FIG. 1.

The color integration processing unit 200 integrates image data of each color (four types of planes of C, M, Y, and K) of CMYK multivalued image data input from the printer driver 13. Hereinafter, the integrated image data is referred to as color plane integration image data. The color plane integration image data is generated by adding a pixel value of the CMYK image data to each color plane. It is not necessary to integrate all of the color planes of CMYK, for example, and only the C plane and the M plane can be integrated.

The print processing unit 202 is similar to that in the first exemplary embodiment and accordingly, the description of the print processing unit 202 is omitted. With respect to the gradation conversion processing unit 201, only points different from the first exemplary embodiment are described.

In the present exemplary embodiment, separation of the color planes and separation of the pass planes is performed. Accordingly, the number of planes after the plane separation is to be the number of passes Nx the number of colors Q. Accordingly, the various variables defined with respect to the pass number k in the first exemplary embodiment are defined with respect to the pass number k ($1 \leq k \leq N$) and the color number j ($1 \leq j \leq Q$).

More specifically, in each plane, a plane separation ratio r (j, k, x, y), an output value O (j, k, x, y), distance information $\delta$ (j, k, x, y), and input/output error $\sigma$ (j, k, x, y) are determined. Only a difference from the first exemplary embodiment is that k that is the one-dimensional index is replaced with the two-dimensional index (j, k). Therefore, in the processing in the gradation conversion processing unit 201 described in the first exemplary embodiment, the index "k" is simply to be replaced with the index (j, k).

By performing the above-described processing, in the pass separation processing in the multipass recording method, both of the dispersiveness in the dot arrangement of each pass plane and the dispersiveness in the dot arrangement in the plane where the pass planes are integrated, can be increased. Further, both of the dispersiveness in the dot arrangement of each color and the dispersiveness in the dot arrangement in the plane where the color planes are integrated, can be increased.

In the present exemplary embodiment, in the case where the pass number N is one, the technique is a binarization technique for implementing intercolor exclusion. In such a case, the technique can be combined with a pass separation technique.

A third exemplary embodiment is described. In the present exemplary embodiment, a method for separating planes for each discharge amount with respect to dots of different discharge amounts is described.

First, a functional configuration of the image forming apparatus 210 according to the present exemplary embodiment is described with reference to FIG. 2. The print processing unit 202 is similar to that in the first exemplary embodiment and accordingly, the description of the print processing unit 202 is omitted. With respect to the gradation conversion processing unit 201, only points different from the first exemplary embodiment are described. The configuration of the hardware and the software in the image processing apparatus 10 according to the third exemplary embodiment is similar to that illustrated in FIG. 1.

In the present exemplary embodiment, the separation of the pass planes and the separation of the discharge amount planes are performed. Accordingly, the number of planes after the plane separation is to be the number of passes N x the number of discharge amount types R. Accordingly, the various variables defined with respect to the pass number k in the first exemplary embodiment are defined with respect to the pass number k ($1 \leq k \leq N$) and the discharge amount number l ($1 \leq l \leq R$).

More specifically, in each plane, a plane separation ratio r (l, k, x, y), an output value O (l, k, x, y), distance information δ (l, k, x, y), and an input/output error σ (l, k, x, y) are determined. Only a difference from the first exemplary embodiment is that k that is the one-dimensional index is replaced with the two-dimensional index (l, k). Therefore, in the processing by the gradation conversion processing unit 201 described in the first exemplary embodiment, the index k is simply to be replaced with the index (l, k).

By performing the above-described processing, in the pass separation processing in the multipass recording method, both of the dispersiveness in the dot arrangement of each pass plane and the dispersiveness in the dot arrangement in the plane where the pass planes are integrated can be increased. Further, both of the dispersiveness in the dot arrangement of each discharge amount and the dispersiveness in the dot arrangement in the plane where the discharge amount planes are integrated can be increased.

The present exemplary embodiment can be used by combining with the second exemplary embodiment. In the present exemplary embodiment, in the case where the pass number N is one, the technique is a binarization technique for implementing inter-discharge amount exclusion. In such a case, the technique can be combined with a pass separation technique.

As described above, according to the exemplary embodiments of the present invention, in the plane separation processing, using the distance information in each plane, to a target pixel of which plane in the planes a quantization value is to be assigned is determined. The plane separation processing includes the plane separation into each pass plane in the multipass recording method, the plane separation into each color plane in CMYK image data, the plane separation into image data of each dot size of the small, medium, and large dots, and the plane separation into each image data of inks of high density and low density.

Similar to the above-described exemplary embodiments, if the present invention is applied to plane separation processing to each image data of inks of high density and low density, the dispersiveness of each plane can be increased. Further, similar to the second exemplary embodiment and the third exemplary embodiment, a plurality of plane separation processing can be combined to implement the present invention.

In the above-described exemplary embodiments, the configurations of assigning the quantization value of the target pixel to a plane having maximum distance information are described. However, it is not necessary to have the maximum information. As long as the dispersiveness in image quality can be increased, the range is not limited, for example, the plane separation can be performed to a plane having second largest distance information.

The present invention can be implemented by executing the following processing. That is, software (program) to implement the functions of the above-described exemplary embodiments is supplied to a system or apparatus via a network or various storage media. A computer (or a CPU or a micro processing unit (MPU)) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-167003 filed Jul. 26, 2010 and No. 2011-099714 filed Apr. 27, 2011, which are hereby incorporated by reference herein in their entirety.

What is claimed is:

1. An image processing apparatus for generating planes, on which recording is performed for a plurality of times on a same area of a recording medium, for forming an image by generating a plurality of image data pieces indicating a dot per pixel and having gradation of an n value, where n is a natural number smaller than m, based on image data having gradation of an m value, the image processing apparatus comprising:

a quantization unit configured to quantize a pixel value of a target pixel in input image data having gradation of an m value into an output value of the target pixel for output image data having gradation of an n value, wherein the output value represents ON or OFF of a dot; and a plane separation unit configured to determine an output value corresponding to the target pixel of each of a plurality of planes, based on the quantization value quantized by the quantization unit, wherein the plurality of planes includes at least two types of planes, wherein the plane separation unit is configured to, in a case where the quantization value of the target pixel represents ON of a dot, set the quantization value representing ON of a dot, to an output value corresponding to the target pixel of any one of the plurality of planes, based on distance information of the target pixel of each plane, the distance information of the target pixel indicating a distance from a pixel having a quantization value representing ON of a dot which has previously been set.

2. The image processing apparatus according to claim 1, wherein the quantization unit is configured to perform the quantization using an error diffusion method.

3. The image processing apparatus according to claim 1, wherein the quantization unit is configured to perform the quantization using a dither matrix.

4. The image processing apparatus according to claim 1, wherein the planes of at least two types include at least one set of planes corresponding to a plurality of passes in a multipass recording method, planes corresponding to a plurality of recording materials, and planes corresponding to a plurality of discharge amounts of a recording material.

5. The image processing apparatus according to claim 1, wherein the plane separation unit is configured to determine that the quantization value is to be assigned to the target pixel of the determined plane by further adding an input/output error being obtained based on the value of the input image data and the quantization value, and distributed to the target pixel of the each plane.

6. The image processing apparatus according to claim 2, further comprising:
a determination unit configured to determine the distance information of the target pixel according to the quantization value of the target pixel in each plane set by the plane separation unit.

7. The image processing apparatus according to claim 6, wherein the determination unit is configured to determine distance information of neighbor pixels of the target pixel based on the distance information of the target pixel.

8. An image processing method for generating planes, on which recording is performed for a plurality of times on a same area of a recording medium, for forming an image by generating a plurality of image data pieces indicating a dot per pixel and having gradation of an n value, where n is a natural number smaller than m, based on image data having gradation of an m value, the image processing method comprising:
quantizing a pixel value of a target pixel in input image data having gradation of an m value into an output value of the target pixel for output image data having gradation of an n value, wherein the output value represents ON or OFF of a dot; and
determining an output value corresponding to the target pixel of each of a plurality of the planes, based on the quantization value quantized by the quantizing, wherein the plurality of planes includes at least two types of planes,
wherein, in a case where the quantization value of the target pixel represents ON of a dot, the quantization value is set representing ON of a dot, to an output value corresponding to the target pixel of any one of the plurality of planes, based on distance information of the target pixel of each plane, the distance information of the target pixel indicating a distance from a pixel having a quantization value representing ON of a dot which has previously been set.

9. A non-transitory computer-readable storage medium containing computer-executable instructions which, when executed by a computer, cause the computer to perform an image processing method according to claim 8.

10. The image processing apparatus according to claim 1, wherein the plane separation unit is configured to, in a case where the quantization value of the target pixel represents ON of a dot, set the quantization value representing ON of a dot to a plane having a maximum distance from a pixel having a quantization value representing ON of a dot, and set a quantization value representing OFF of a dot to each of the target pixel(s) of a remaining plane(s).

11. The image processing apparatus according to claim 10, wherein the plane separation unit is configured to, in a case where the quantization value of the target pixel represents OFF of a dot, set a quantization value representing OFF of a dot to each of the target pixels of all planes.

12. The image processing apparatus according to claim 1, wherein quantization processing performed by the quantization unit and plane separation processing subsequently performed by the plane separation unit are repeated pixel by pixel.

* * * * *